United States Patent
Reiter

(10) Patent No.: US 6,896,209 B2
(45) Date of Patent: May 24, 2005

(54) FUEL INJECTION VALVE

(75) Inventor: Ferdinand Reiter, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 173 days.

(21) Appl. No.: 10/110,247

(22) PCT Filed: Aug. 3, 2001

(86) PCT No.: PCT/DE01/02968

§ 371 (c)(1),
(2), (4) Date: Jul. 29, 2002

(87) PCT Pub. No.: WO02/12713

PCT Pub. Date: Feb. 14, 2002

(65) Prior Publication Data

US 2003/0116655 A1 Jun. 26, 2003

(30) Foreign Application Priority Data

Aug. 10, 2000 (DE) .......................................... 100 39 076

(51) Int. Cl.⁷ .............................. B05B 1/30; F02M 39/00
(52) U.S. Cl. ................................ 239/585.1; 239/585.5; 239/533.3; 239/533.8; 239/88
(58) Field of Search .......................... 239/585.1–585.5, 239/533.2, 533.3, 533.8, 533.9, 88–93; 251/129.15, 129.21; 29/890.124, 890.127

(56) References Cited

U.S. PATENT DOCUMENTS

| | | | | |
|---|---|---|---|---|
| 4,240,056 A | * | 12/1980 | Mayer | ........................ 335/267 |
| 4,660,011 A | | 4/1987 | Reiter | |
| 5,407,131 A | * | 4/1995 | Maley et al. | ................. 239/90 |
| 5,494,219 A | * | 2/1996 | Maley et al. | ................. 239/88 |
| 5,769,391 A | * | 6/1998 | Noller et al. | .......... 251/129.21 |
| 5,887,799 A | | 3/1999 | Smith | |
| 6,069,479 A | * | 5/2000 | Taicher et al. | .............. 324/309 |

FOREIGN PATENT DOCUMENTS

DE      195 03 821      8/1996

* cited by examiner

Primary Examiner—Davis Hwu
(74) Attorney, Agent, or Firm—Kenyon & Kenyon

(57) ABSTRACT

A fuel injector, in particular an injector for direct injection of fuel into a combustion chamber of a mixture-compressing, spark-ignition internal combustion engine has a solenoid, which cooperates with an armature, and a magnetic internal pole and a magnetic external pole, the armature being connected in a force-locking manner to a valve needle for actuating of the fuel injector, the valve needle having on its injection end a valve-closure member, which cooperates with a valve seat. At least one permanent magnet is arranged in a connecting area between the internal pole and the external pole.

34 Claims, 2 Drawing Sheets

FUEL INJECTION VALVE

FIELD OF THE INVENTION

The present invention relates to a fuel injector.

BACKGROUND INFORMATION

For magnetic throttling between the poles of an electromagnetically operable fuel injector, usually either a non-magnetic intermediate component is used or the seat carrier or the valve casing is equipped with a thin-walled collar as a throttle, depending on the design of the fuel injector. The magnetic circuit rapidly approaches saturation in the throttle location due to the fact that the material has a small wall thickness.

For operation of high-pressure fuel injectors, a connecting element or a supporting ring is mounted around the throttle location to mechanically reinforce the resulting mechanically weak spot.

For example, German Published Patent Application No. 195 03 821 describes a fuel injector in which the number of components of the valve tube is reduced so that the number of joints and connection points is also reduced. The entire valve tube is made of a magnetically conducting material, so that no nonmagnetic intermediate components are necessary. A thin-walled throttle point is provided between the core and the valve seat carrier.

One disadvantage of the fuel injectors described above is in particular the mechanical weakening of the valve housing or the seat carrier at the location of the magnetic throttle. Since the fuel injectors are designed mainly for direct injection of fuel into the combustion chamber of internal combustion engines having fuel mixture compression and spark ignition, high pressures prevail in the combustion chamber as well as in the fuel injector, potentially damaging the fuel injector during operation.

The connecting components normally used to reinforce the housing have the disadvantage that they must be made of a nonferritic material, independently of the internal pole and the external pole. Assembly of the connecting components may also damage the housing, which is weak at this point.

SUMMARY

The fuel injector according to the present invention, the magnetic throttling is achieved by attaching permanent magnets to the connecting area, which is manufactured in normal thickness, between the internal pole and the external pole of the fuel injector. The permanent magnets create a primary flux in the ferritic material of the external pole, which makes available only a reduced cross section for the secondary flux generated by the solenoid.

The present invention provides the possibility of selecting any desired number and spacings of the permanent magnets. A single ring-shaped permanent magnet may be simple to manufacture and easy to mount.

The present invention provides various options for attaching the permanent magnets to the external pole. The present invention also provides attachment through the magnetic force of the permanent magnets.

A secure seating on the housing may be achieved by sheathing the assembled permanent magnets with a plastic sheath.

The permanent magnets may be configured in the form of annular segments which are in contact with the housing due to a suitably selected radius of curvature.

The present invention also provides for the possibility of influencing the properties of the fuel injector through targeted magnetization of the permanent magnets after assembly.

Materials for manufacturing the permanent magnets include, e.g., substances having a high energy content, such as iron-neodymium-boron or compounds of cobalt with rare earth metals.

One example embodiment of the present invention is illustrated schematically in the drawings and explained in greater detail in the following description.

DETAILED DESCRIPTION

Figure 1:
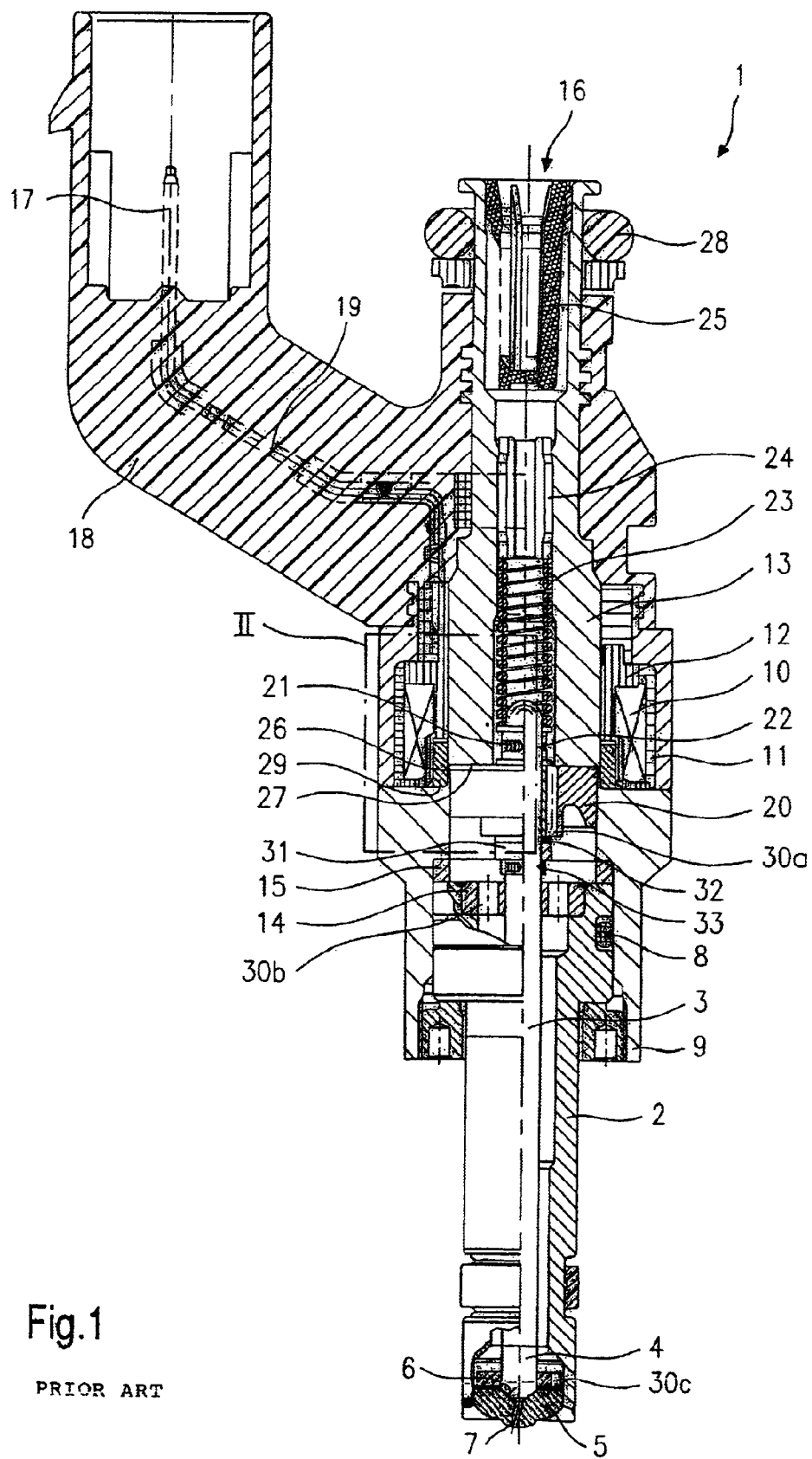
FIG. 1A is a schematic cross-sectional through an example of a conventional fuel injector.
FIG. 1B is an enlarged schematic cross-sectional view in area II illustrated in FIG. 1A.
Figure 3:
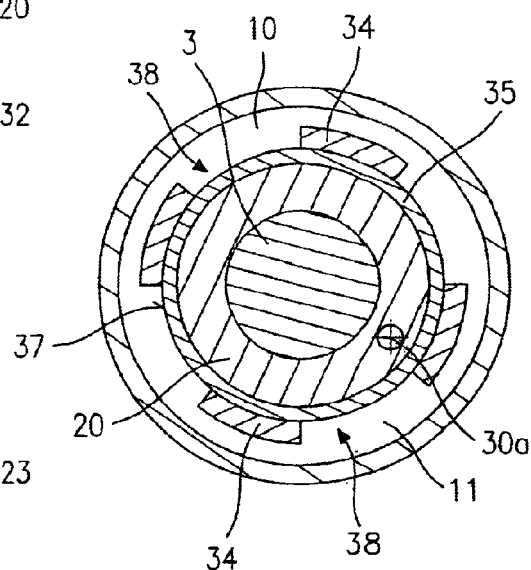
FIG. 3 is a cross-sectional view through the example embodiment illustrated in FIG. 2 of the fuel injector according to the present invention taken along line III—III of FIG. 2.
Figure 2:
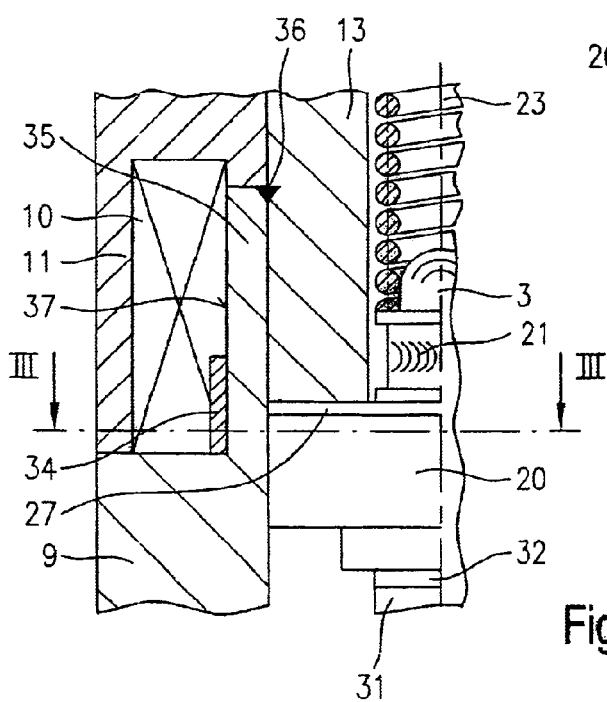
FIG. 2 is a longitudinal cross-sectional view through an example embodiment of a fuel injector according to the present invention in the same area II as illustrated in FIG. 1B.

Before describing an embodiment of a fuel injector 1 according to the present invention on the basis of FIGS. 2 and 3, the essential components of a conventional fuel injector which has the same configuration except for the measures according to the present invention is explained briefly for a better understanding of the present invention on the basis of FIG. 1.

Fuel injector 1 is configured in the form of a fuel injector for fuel injection systems of engines having fuel mixture compression and spark ignition. Fuel injector 1 is suitable in particular for direct injection of fuel into the combustion chamber of an engine.

Fuel injector 1 is made of a nozzle body 2 in which a valve needle 3 is arranged. Valve needle 3 is mechanically connected to a valve-closure member 4, which cooperates with a valve-seat surface 6 on a valve seat body 5 to form a sealing seat. In this embodiment, fuel injector 1 is an inwardly opening fuel injector 1 which has an injection orifice 7. Nozzle body 2 is sealed by a gasket 8 from external pole 9 of a solenoid 10. Solenoid 10 is encapsulated in a coil housing 11 and wound onto a field spool 12, which is in contact with an internal pole 13 of solenoid 10. Internal pole 13 and external pole 9 are separated from one another by a constriction 26 and are joined by a non-ferromagnetic connecting component 29. Solenoid 10 is energized by an electric current that may be supplied over an electric plug-in contact 17 via a line 19. Plug-in contact 17 is enclosed by plastic sheathing 18, which may be integrally molded on internal pole 13.

Valve needle 3 is guided in a disk-shaped valve needle guide 14. A matching adjusting disk 15 is used to adjust the lift. An armature 20 is situated on the other side of adjusting disk 15. Via a first flange 21, the armature is connected in a force-locking manner with valve needle 3, which is joined by a weld 22 to first flange 21. A restoring spring 23, which is pre-stressed by a sleeve 24 in the present configuration of fuel injector 1, is supported on first flange 21. Fuel channels 30a through 30c convey fuel, which is supplied through a central fuel feed 16 and is filtered through a filter element 25, to injection orifice 7, these channels extending in valve needle guide 14, in armature 20 and on valve seat body 5. Fuel injector 1 is sealed from a fuel line by a gasket 28.

An annular damping element 32 made of an elastomer material is arranged on the injection side of armature 20. The element 32 sits on a second flange 31 which is connected in a force-locking manner with valve needle 3 via a weld 33.

In the resting state of fuel injector 1, armature 20 is acted upon by restoring spring 23 against its direction of lift, so that valve-closure member 4 is held in sealing contact on valve seat 6. When solenoid 10 is energized, it builds up a magnetic field which moves armature 20 in the direction of lift against the elastic force of restoring spring 23, the lift being predetermined by a working gap 27 between internal pole 12 and armature 20 in the resting position. Armature 20 also entrains first flange 21, which is welded to valve needle 3, in the direction of lift. Valve-closure member 4, which is connected to valve needle 3, is lifted up from valve-seat surface 6, and fuel carried through fuel channels 30a through 30c is injected through injection orifice 7.

When the coil current is turned off, armature 20 drops back from internal pole 13 due to the pressure of restoring spring 23 after the magnetic field has declined sufficiently, so that first flange 21 which is connected to valve needle 3 moves against the direction of lift. Valve needle 3 is thus moved in the same direction, so that valve-closure member 4 is set down on valve-seat surface 6 and fuel injector 1 is closed.

Figure 1B:
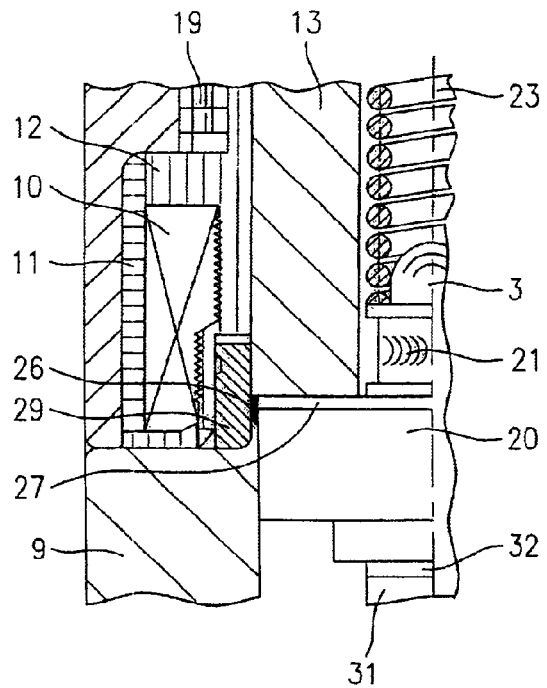

FIG. 1B illustrates an enlarged view of area II in FIG. 1A in cross-section.

Constriction 26 between internal pole 13 and external pole 9, which acts as a magnetic throttle, is a potential mechanical weak point of fuel injector 1. Since fuel injector 1 is operated under high pressure, it is customary to reinforce constriction 26 with connecting component 29 so that fuel injector 1 is not deformed or damaged by the high pressure prevailing in the interior during operation.

Connecting component 29 is usually designed with an annular shape and surrounds internal pole 13 in the area of constriction 26 to stabilize fuel injector 1. In order for constriction 26 not to lose its effect as a magnetic throttle, connecting component 29 must be made of a material which is not ferritic.

Production and assembly of such a connecting component 29 is associated with additional costs and complexity, and furthermore, the mechanical weak point at constriction 26 may be damaged during the assembly of connecting component 29.

In a cross-sectional view in the same area as FIG. 1B, FIG. 2 illustrates an example embodiment of a fuel injector 1 according to the present invention. Identical components are labeled with the same reference numbers to facilitate a comparison.

Fuel injector 1 according to the present invention has a configuration similar to that of the fuel injector described in conjunction with FIG. 1A, so the following description is limited to the essential features.

Instead of having a constriction 26 between internal pole 13 and external pole 9, fuel injector 1 in the example embodiment has a tubular extension 35 of external pole 9, which is joined to internal pole 13 by a weld 36. Internal pole 13 and armature 20 pass through tubular extension 35 of external pole 9. Permanent magnets 34 extend axially from an area of external pole 9 in which armature 20 is guided over working gap 27 to internal pole 13, which is arranged in tubular extension 35 of external pole 9.

The arrangement of permanent magnets 34 on outer side 37 of external pole 9 yields a throttle effect which is produced by the opposite actions of the magnetic field of permanent magnets 34 and the magnetic field produced by solenoid 10.

Permanent magnets 34 produce a locally limited magnetic flux, which claims a certain cross-section in the material of tubular extension 35 of external pole 9 in contact with permanent magnets 34. Therefore, only a reduced cross-section is available for the secondary flux when solenoid 10 is energized for actuation of fuel injector 1 and it rapidly approaches saturation, like constriction 26 between internal pole 13 and external pole 9 in fuel injector 1, as described in conjunction with FIGS. 1A and 1B, and therefore it acts as a magnetic throttle. Then a mechanical weak spot no longer exists.

Suitable materials for manufacturing the permanent magnets include substances having a high energy content, such as iron-neodymium-boron or compounds of cobalt with rare earth metals.

The polarity of permanent magnets 34 may be the same or opposite that of the magnetic field generated by solenoid 10. Permanent magnets 34 may be magnetized either before or after assembly on fuel injector 1.

Different variants are possible with regard to the shape and number of permanent magnets 34. In the simplest case, permanent magnet 34 may be configured as a closed ring which is placed on tubular extension 35 of external pole 9. Prefabricated solenoid 10 may be subsequently placed there.

To save on material and weight, the ring may be divided into several individual permanent magnets 34, which are in the form of annular segments having the same radius of curvature as tubular extension 35 of external pole 9. Almost any desired number of permanent magnets 34 may be used, but for reasons of symmetry there may be a certain minimum number, e.g., four. A rectangular segment shape is also possible.

Various mounting options are possible so that permanent magnets 34 in the form of rectangular and annular segments in particular will remain in the proper positions on the external pole.

First, permanent magnets 34 may be held directly on external pole 9 by their magnetic force due to the ferritic material. Secondly, adhesive bonds such as those formed by direct gluing or by fastening with double-sided adhesive tape may also be used. An extruded plastic sheathing on permanent magnets 34, which adhere magnetically to external pole 9, to better secure them is also possible.

FIG. 3 illustrates the example embodiment of a fuel injector 1 according to the present invention, as illustrated in FIG. 2, on the basis of a schematic cross-sectional view taken along line III—III in FIG. 2, as representative for the variants described above.

Armature 20, which is provided with at least one bore 30a for fuel, is arranged on valve needle 3. Armature 20 is guided in tubular extension 35 of external pole 9. In the example embodiment, four permanent magnets 34 in the form of annular segments separated by an equal number of recesses 38 are in contact with outside 37 of tubular extension 35. Permanent magnets 34 and recesses 3B between them cover approximately equal angular sections of approx. 45° each. Solenoid 10 is arranged on permanent magnets 34 on the outside radially and is sealed from the outside by coil housing 11.

In addition to the throttle effect, permanent magnets 34 also offer the possibility of altering the properties of fuel injector 1 in a controlled manner when fuel injector 1 is completely assembled. In particular, it is possible to adjust the dynamic flow rate of fuel through fuel injector 1.

The present invention is not limited to the example embodiments illustrated here and may also be used for any other configurations of fuel injectors, e.g., for outwardly opening fuel injectors, or for other types of armatures, e.g., flat-type armatures.

What is claimed is:

1. A fuel injector, comprising:

an armature;

a solenoid configured to cooperate with the armature;

a magnetic internal pole; and a magnetic external pole;

wherein the armature is connected in a force-locking manner with a valve needle configured to actuate the fuel injector, the valve needle including a valve-closure member on an injection end configured to cooperate with a valve seat, at least one permanent magnet arranged on a connecting area between the internal pole and the external pole;

wherein the external pole includes a tubular extension in a direction of the internal pole;

wherein the tubular extension wraps around the armature and the internal pole; and wherein the permanent magnet abuts against an outer side of the tubular extension.

2. The fuel injector according to claim 1, wherein the permanent magnet includes a cylindrical ring and is arranged on the external pole.

3. The fuel injector according to claim 1, wherein the at least one permanent magnet includes a plurality of permanent magnets configured in the form of annular segments arranged on a periphery of the external pole.

4. The fuel injector according to claim 1, wherein the at least one permanent magnet includes a plurality of permanent magnets configured in the form of rectangular segments arranged on a periphery of the external pole.

5. The fuel injector according to claim 1, wherein each permanent magnet is magnetized before assembly.

6. The fuel injector according to claim 1, wherein each permanent magnet includes a neodymium-iron-boron compound.

7. The fuel injector according to claim 1, wherein each permanent magnet includes a rare earth-cobalt compound.

8. The fuel injector according to claim 1, wherein the fuel injector is configured for direction injection of fuel into a combustion chamber of a mixture-compressing, spark-ignition internal combustion engine.

9. A fuel injector, comprising:

an armature;

a solenoid configured to cooperate with the armature;

a magnetic internal pole; and a magnetic external pole;

wherein the armature is connected in a force-locking manner with a valve needle configured to actuate the fuel injector, the valve needle including a valve-closure member on an injection end configured to cooperate with a valve seat, at least one permanent magnet arranged on a connecting area between the internal pole and the external pole;

wherein the external pole includes a tubular extension in a direction of the internal pole; and wherein the permanent magnet is secured by a magnetic force to an outer side of the tubular extension.

10. The fuel injector according to claim 9, wherein the permanent magnet includes a cylindrical ring and is arranged on the external pole.

11. The fuel injector according to claim 9, wherein the at least one permanent magnet includes a plurality of permanent magnets configured in the form of annular segments arranged on a periphery of the external pole.

12. The fuel injector according to claim 9, wherein the at least one permanent magnet includes a plurality of permanent magnets configured in the form of rectangular segments arranged on a periphery of the external pole.

13. The fuel injector according to claim 9, wherein each permanent magnet is magnetized before assembly.

14. The fuel injector according to claim 9, wherein each permanent magnet includes a neodymium-iron-boron compound.

15. The fuel injector according to claim 9, wherein each permanent magnet includes a rare earth-cobalt compound.

16. The fuel injector according to claim 9, wherein the fuel injector is configured for direction injection of fuel into a combustion chamber of a mixture-compressing, spark-ignition internal combustion engine.

17. A fuel injector, comprising:

an armature;

a solenoid configured to cooperate with the armature;

a magnetic internal pole; and a magnetic external pole;

wherein the armature is connected in a force-locking manner with a valve needle configured to actuate the fuel injector, the valve needle including a valve-closure member on an injection end configured to cooperate with a valve seat, at least one permanent magnet arranged on a connecting area between the internal pole and the external pole;

wherein the external pole includes a tubular extension in a direction of the internal pole; and wherein the permanent magnet is secured by glue to an outer side of the tubular extension.

18. The fuel injector according to claim 17, wherein the permanent magnet is secured by double-sided adhesive tape to the outer side of the tubular extension.

19. The fuel injector according to claim 17, wherein the permanent magnet is glued directly onto the outer side of the tubular extension.

20. The fuel injector according to claim 9, wherein the permanent magnet includes a cylindrical ring and is arranged on the external pole.

21. The fuel injector according to claim 17, wherein the at least one permanent magnet includes a plurality of permanent magnets configured in the form of annular segments arranged on a periphery of the external pole.

22. The fuel injector according to claim 17, wherein the at least one permanent magnet includes a plurality of permanent magnets configured in the form of rectangular segments arranged on a periphery of the external pole.

23. The fuel injector according to claim 17, wherein each permanent magnet is magnetized before assembly.

24. The fuel injector according to claim 17, wherein each permanent magnet includes a neodymium-iron-boron compound.

25. The fuel injector according to claim 17, wherein each permanent magnet includes a rare earth-cobalt compound.

26. The fuel injector according to claim 17, wherein the fuel injector is configured for direction injection of fuel into a combustion chamber of a mixture-compressing, spark-ignition internal combustion engine.

27. A fuel injector, comprising:

an armature;

a solenoid configured to cooperate with the armature;

a magnetic internal pole; and a magnetic external pole;

wherein the armature is connected in a force-locking manner with a valve needle configured to actuate the fuel injector, the valve needle including a valve-closure member on an injection end configured to cooperate with a valve seat, at least one permanent magnet arranged on a connecting area between the internal pole and the external pole;

wherein the external pole includes a tubular extension in a direction of the internal pole; and wherein the permanent magnet is secured by extrusion coating with plastic to an outer side of the tubular extension.

28. The fuel injector according to claim 27, wherein the permanent magnet includes a cylindrical ring and is arranged on the external pole.

29. The fuel injector according to claim 27, wherein the at least one permanent magnet includes a plurality of permanent magnets configured in the form of annular segments arranged on a periphery of the external pole.

30. The fuel injector according to claim 27, wherein the at least one permanent magnet includes a plurality of permanent magnets configured in the form of rectangular segments arranged on a periphery of the external pole.

31. The fuel injector according to claim 27, wherein each permanent magnet is magnetized before assembly.

32. The fuel injector according to claim 27, wherein each permanent magnet includes a neodymium-iron-boron compound.

33. The fuel injector according to claim 27, wherein each permanent magnet includes a rare earth-cobalt compound.

34. The fuel injector according to claim 27, wherein the fuel injector is configured for direction of fuel into a combustion chamber of a mixture-compressing, spark-ignition internal combustion engine.

* * * * *

UNITED STATES PATENT AND TRADEMARK OFFICE
CERTIFICATE OF CORRECTION

PATENT NO. : 6,896,209 B2  Page 1 of 1
APPLICATION NO. : 10/110247
DATED : May 24, 2005
INVENTOR(S) : Ferdinand Reiter It is certified that error appears in the above-identified patent and that said Letters Patent is hereby corrected as shown below:

Column 1, line 45, change "The fuel injector" to --In the fuel injector--

Column 2, line 15, change "a schematic cross-sectional through" to --a schematic cross-sectional view through--

Column 5, line 51, change "for direction injection of fuel" to --for direct injection of fuel--

Column 6, line 22, change "for direction injection of fuel" to --for direct injection of fuel--

Column 6, line 48, change "according to claim 9," to --according to claim 17,--

Column 6, line 67, change "for direction injection of fuel" to --for direct injection of fuel--

Column 8, line 17, change "for direction of fuel" to --for direct injection of fuel--

Signed and Sealed this

Third Day of April, 2007

JON W. DUDAS
*Director of the United States Patent and Trademark Office*